July 3, 1962 R. P. ALLEY ETAL 3,042,837
FAIL SAFE OVERLOAD PROTECTIVE SYSTEM
Filed Nov. 17, 1958
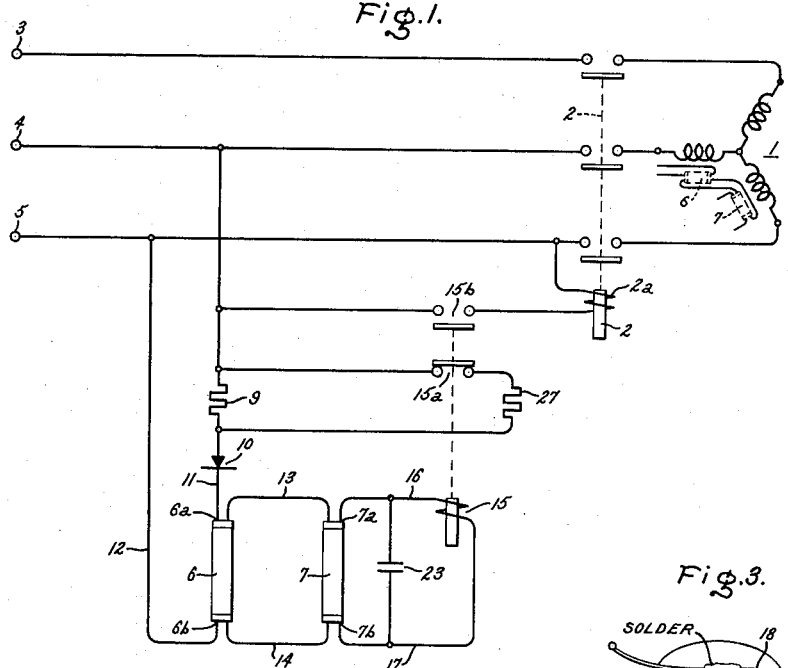
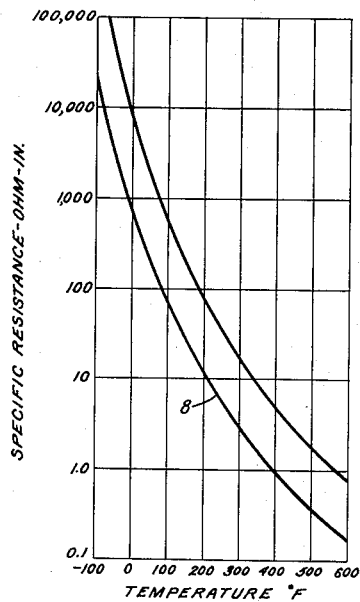
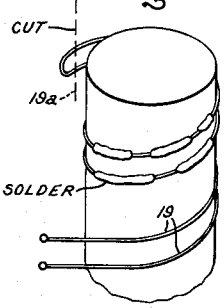
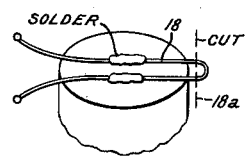
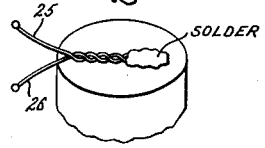
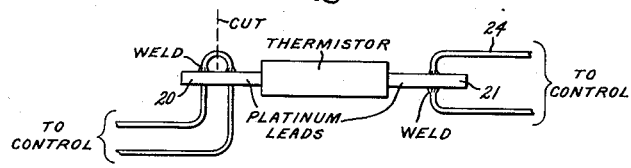
Inventors:
Robert P. Alley,
Walter F. Dowdle,
by Irving H. Marshman
their Attorney.

United States Patent Office 3,042,837
Patented July 3, 1962

3,042,837
FAIL SAFE OVERLOAD PROTECTIVE SYSTEM
Robert P. Alley, Shirley, and Walter F. Dowdle, Lincoln, Ill., assignors to General Electric Company, a corporation of New York
Filed Nov. 17, 1958, Ser. No. 774,534
5 Claims. (Cl. 317—41)

This invention relates to control systems, more particularly to control systems for dynamoelectric machines such as motors and generators, and it has for an objective the provision of a simple, reliable and improved control system of this character.

More specifically, the invention relates to overload protective control systems in which thermally sensitive resistors having negative temperature coefficients are utilized for sensing overload conditions, and a more specific object of the invention is to provide a system of this character in which any component failure or open lead conductor will not result in an unsafe condition of the system.

In carrying the invention into effect in one form thereof, a pair of thermally responsive resistance elements having negative temperature co-efficients and adapted to be mounted in selected locations on a dynamoelectric machine are connected in parallel relationship with each other to receive voltage supplied from a pair of supply terminals. Response to an overload condition to initiate a protective operation is provided by means of an electro-responsive device having an operating winding connected in parallel with both thermally sensitive devices to be supplied with a voltage derived therefrom. To ensure fail safe operation in the event of breakage of a thermistor lead, two mechanically separate leads are provided to each thermistor terminal. Preferably, these separate leads are connected to each terminal at spaced apart points. In the preferred embodiment of the invention means are provided for materially reducing the differential between temperatures at which the electro-responsive device picks up and drops out.

For a better and more complete understanding of the invention, reference should now be had to the following specification and to the accompanying drawing of which FIG. 1 is a simple diagrammatical sketch of an embodiment of the invention, FIG. 2 is a chart of characteristic curves illustrating the relationship between temperature and specific resistance of a thermally sensitive resistor of the type employed in the embodiment of the invention illustrated herein. FIGS. 3, 4, 5, and 6 are views illustrating details of electrical connections of leads to the negative temperature co-efficient resistors employed in various embodiments of this invention.

Referring now to the drawing, a dynamoelectric machine such for example as an induction motor 1 is connected by means of line contactor 2 to be supplied from a suitable source such for example as the three alternating voltage supply terminals 3, 4 and 5.

Mounted on the motor, preferably embedded in an electrically insulating but thermally conducting compound in the end turns of its stator winding, are a pair of thermally sensitive resistance devices 6 and 7 connected in parallel relationship. These thermally sensitive resistance devices are of the type generally known in the art as thermistors. They are electronic semi-conductors which are extremely sensitive to slight temperature variations. Changes in temperature as small as one thousandth of a degree C. can be measured with the aid of a thermistor. While conductors or typical metals have small positive temperature co-efficients of electrical resistivity, thermistors have high negative temperature co-efficients. When thermistors are cold, their resistance is high, however as their temperature rises, their resistance drops rapidly. A well known thermistor material is composed of manganese, nickel and cobalt oxides. The relationship between specific resistance in ohm-inches and temperature in degrees F. of such resistance material is represented by curve 8 of FIG. 2. In a typical case, the thermistors 6 and 7 may each have resistances of 10,000 ohms at 25° C. and approximately 580 ohms at 105° C. Although the thermistors 6 and 7 may be of any suitable form such for example as rod, disc or bead, they are illustrated in FIG. 1 as being of the rod type. The parallel combination of thermistors 6 and 7 is supplied from a suitable source of voltage which is represented by the alternating voltage supply terminals which may be the terminals 4 and 5 of one phase of the three phase terminals 3, 4, and 5. The two thermistors may be embedded in two phases of a three phase winding as illustrated in dotted lines in FIG. 1 or in the case of a motor having start and run windings one may be embedded in the starting winding and the other in the run winding.

As shown, the upper terminal 6a of thermistor 6 is connected to the supply terminal 4 through a voltage dropping resistor 9, a half wave rectifier 10 and a conductor 11. Typically the resistor 9 may have a value of 7500 ohms and a five watt rating. The lower terminal 6b is connected to the supply conductor 5 through a conductor 12. By means of a pair of leads 13 and 14 the upper terminal 7a and the lower terminal 7b of thermistor 7 are connected to corresponding upper and lower terminals 6a and 6b of thermistor 6 at points which are mechanically separated from the points of attachment of conductors 11 and 12. The terminals of the operating coil of relay 15 are connected by means of conductors 16 and 17 to the terminals 7a and 7b of thermistor 7 at points which are mechanically separated from the points of connection of conductors 13 and 14. Appropriately, the relay may have a 380 ohm coil of 10,400 turns and may be designed to "pick up" on 0.017 amperes.

In order to provide mechanically separate connections of the leads to the thermistors the leads may be attached by one of the means illustrated in FIGS. 3, 4, 5 and 6. In FIG. 3 a wire loop 18 is laid across the metallized end terminal of a disc type thermistor and soldered to it. The looped end is then clipped at 18a to provide a connection of two leads at mechanically separated points. A similar construction is provided for a rod type thermistor by winding a loop 19 around the metallized end as shown in FIG. 4. Both legs of the loop are soldered to the metallized end of the rod and the end of the loop is then clipped along the line 19a.

In a modified form illustrated in FIG. 5, the thermistor has leads 20 and 21 which are inserted in the ends of the shaped thermistor body and "fired in" when the body is fired to produce the final stage hard ceramic product. These "fired in" leads may be of any suitable metal such as platinum. The control wire may be attached by passing the ends of both sides of a loop of wire through holes in the platinum lead, or by laying the loop on the platinum lead then welding each side of the loop to the platinum lead 20 and cut as shown at the left hand end to provide mechanical separation of the connections. Alternatively as shown at the right end of the thermistor, the end of one side of a loop of wire 24 is passed through a single hole in the fired in lead or laid on the lead and welded at the junction.

If the thermistor, either disc or rod form, is to be encapsulated in an electrical insulating mass as will generally be the case when thermistors are embedded in motor windings, the two leads 25 and 26 may be twisted together and soldered to the metallized end of the thermistor as illustrated in FIG. 6. The plastic encapsulation, preferably an epoxy resin, effectively prevents mechanical separation of the leads from the thermistor. Consequently, in such cases it is possible to dispense with the additional protection afforded by connecting the leads at mechanically separated points.

A typical temperature at which the thermistor furnishes the current for the number of ampere turns required to pick up the relay would be 75° C., and a typical drop out temperature which would reduce the ampere turns to the drop out value would be 105° C. Thus, the normal temperature differential between pickup and dropout would be 30° C. A temperature differential of this magnitude would require an unnecessarily long time to elapse between dropout in response to overload and reset following the disappearance of the overload. In order to reduce the normal differential to a lower and more acceptable value, a resistor 27 is connected through the normally closed contacts 15a of relay 15 in a branch circuit in parallel with resistor 9 when the relay is deenergized. Appropriately, the resistor 27 may have a value somewhat greater than that of resistor 9, e.g. it may have a resistance of 8200 ohms. Alternately, this contact 15a may be mounted on and operated by contactor 2.

The operating coil 2a of line contactor 2 is connected across supply terminals 4 and 5 by means of contacts 15b of the relay which are closed when the relay is energized and picked up.

Connected in parallel circuit relationship with the thermistors 6 and 7 is a capacitor 23. This capacitor may appropriately have a value of 25 mfd. The rectifier capacitor combination supplies filtered direct voltage to the thermistors and the coil of the relay while the resistor 9 serves as a current limiter. If the capacitor is replaced by a resistor the differential is reduced and operation remains reliable even at low thermistor temperatures.

In operation, when alternating voltage is first applied, current can flow through resistor 9 and the parallel branch through the normally closed contact and resistor 27 and through the rectifier. From the rectifier the current flows to terminal 6a of thermistor 6, through conductor 13 to terminal 7a of thermistor 7 and through conductor 16 to and through the operating coil of relay 15 and then through conductor 17 to terminal 7b of thermistor 7, through conductor 14 to terminal 6b of thermistor 6 and conductor 12 to the supply terminal 5. When the capacitor 23 charges sufficiently, as it does in approximately ½ cycle, the relay 15 picks up and closes if the thermistors are below the pick up temperature which may be 75° C.

In picking up, relay 15 opens its normally closed contact 15a and closes its normally open contact 15b to complete an energizing circuit for the operating coil of line contactor 2. In response to energization, contactor 2 picks up and connects motor 1 to the supply terminals 3, 4 and 5.

If the motor fails to start or overheats simply because of an overload, the thermistors 6 and 7 shunting the relay coil reduce the voltage at its terminals below the dropout value. As a result, the relay drops out and opens its normally open contacts to interrupt the energizing circuit for the line contactor 2 which thereupon drops out and disconnects the motor 1 from the supply terminals. Relay 15 in dropping out closes its normally closed contact 15a to connect the reset resistor 27 in parallel with the voltage dropping resistor 9 to reduce the temperature differential for reset. When the thermistors cool to the reset value, the relay 15 again picks up and in closing picks up contactor 2 to reconnect the motor to the supply terminals. The relay and contactor remain picked up until the supply power is removed or the motor again overheats. Without the aid of the reset resistor, the thermistors would have to cool to the pick-up temperature i.e. 75° C. before the relay 15 would pick up to reset the control. Thus without resistor 27 the temperature differential of the reset operation would be 30° C. The reset resistor has the effect of reducing this differential to a much lower value e.g. 15° C. Thus typically, upon the thermistors' cooling to a temperature of approximately 90° C. the relay 15 will pick up and reset the control.

The circuit behavior to provide fail-safe control in response to various failures is as follows:

*Thermistor Connection.*—The opening, for any reason, of any lead in a connection to a thermistor causes the relay 15 to drop out and remain dropped out. If one thermistor becomes broken into two separate parts, but with ends and lead connections intact the other thermistor continues to protect the motor, although at a slightly higher temperature. Since small disc thermistors are mechanically quite rugged, the possibility of a thermistor breaking into two parts is rather remote. If either or both thermistors become short circuited, relay 15 opens.

*Resistors.*—If resistor 9 becomes open circuited, relay 15 drops out and since resistor 27 has more resistance than resistor 9, the relay remains dropped out. If resistor 27 becomes open circuited, the dropout operation is the same as it would have been if the resistor had not become open circuited; in other words the relay drops out in the usual manner to protect the motor, but does not reset until the motor temperature has dropped to a lower value than would have been the case if resistor 27 had not become open circuited. Should the resistor 9 become short circuited either the rectifier or the thermistors burn out thereby either to open circuit or short circuit relay coil giving fail-safe operation. Resistor 27 is selected so that the relay contacts cannot chatter and cause the contactor to chatter.

*Rectifier.*—If the rectifier 10 becomes open circuited, no voltage is supplied across the operating coil of the relay 15 and consequently, it drops out. If the rectifier becomes short circuited an alternating voltage is supplied to the relay. The A.-C. impedance of the relay is much greater than its D.-C. resistance and, consequently, insufficient current flows through it to maintain it in its picked up position. The energy storage action of the capacitor 23 is also less effective for an alternating than for a direct voltage.

*Relay.*—If the operating coil of the relay becomes open circuited, the relay drops out. Also, if the coil is short circuited the relay drops out. If the normally closed contact 15a of the relay becomes welded closed, the relay construction is such that 15b never closes to energize contactor 2. On the other hand if the normally closed contacts fail to close, the pickup or reset temperature is lowered. The load in the circuit of the normally open contact 15b must be chosen below the weld rating of the tips of these contacts in order to obtain trouble free operation. If the normally open contacts 15b fail to close, the motor remains de-energized and at rest.

*Capacitor.*—If the capacitor 23 becomes short circuited, the relay drops out. If the capacitor becomes open circuited the half wave D.-C. voltage on the relay coil still gives reliable operation. Reliable operation with no capacitor with the thermistors at very low temperatures is secured by shunting the relay coil by a resistor, typically 2700 ohms.

From the foregoing it is seen that the circuit is fail safe, the relay opens and de-energizes the contactor 2 to disconnect the motor from the supply terminals 3, 4 and 5 for any failure of any single component or lead of the system. Since the operating coil of the relay is directly connected in parallel with the thermistors, the circuit gives the maximum of sensitivity for the minimum of thermistor heat dissipation.

Although, in accordance with the provisions of the patent statutes the invention has been described and the principle has been explained together with the best mode contemplated for carrying out the invention it will be understood that the apparatus shown and described is merely illustrative and that the invention is not limited thereto since alterations and modifications will readily suggest themselves to persons skilled in the art without departing from the true spirit of the invention or from the scope of the annexed claims.

What we claim as new and desire to secure by Letters Patent of the United States:

1. An overload protective control system for a dynamo electric machine adapted to be energized from a pair of supply terminals, comprising a pair of thermally responsive devices having negative temperature coefficients connected in parallel relationship and adapted to be mounted in a dynamo electric machine in predetermined locations, a voltage dropping resistor connected in series with the parallel combination of said thermally sensitive devices, the series parallel combination of said dropping resistor and said thermally-responsive devices having terminals adapted for connection to the supply terminals so that the thermally-responsive devices are supplied with a voltage derived from the supply terminals through the dropping resistor, a second resistor included in a branch circuit in parallel with said voltage dropping resistor, and means for protectively deenergizing said dynamo electric machine in response to increased temperatures in said machine, said last-named means including an electroresponsive device having an operating coil connected in parallel with said thermally sensitive devices to be supplied with a voltage derived therefrom and having an armature operated to a first position in response to a predetermined temperature of said thermally sensitive devices and operated to a second position in response to a predetermined higher temperature, and a contact in said branch circuit opened in said first position of said armature and closed in said second position for effecting a reduction in the temperature differential between the operations of said electroresponsive device to said first and second positions.

2. An overload protective control system for a dynamo-electric machine adapted to be energized from a pair of alternating voltage supply terminals comprising, a pair of thermally responsive resistance devices having negative temperature coefficients connected in parallel relationship and adapted to be mounted in a dynamo electric machine in predetermined locations, a pair of resistors each connected in a different branch circuit of a parallel combination, a rectifier connected in series relationship with said parallel combination to be between one of said supply terminals and one terminal of each of said thermally sensitive devices, the other terminals of said thermally sensitive devices being adapted for connection to the other of said supply terminals, and means for protectively deenergizing said dynamo electric machine in response to increased temperatures in said machine, said last-named means including an electroresponsive device having an operating coil connected in parallel with said thermally sensitive devices to be supplied therefrom and having a contact in one of said branch circuits opened in response to a predetermined temperature of said thermally sensitive devices and closed in response to a predetermined higher temperature of said thermally sensitive devices to effect a reduction in the temperature differential between the operation of said electroresponsive device to said first and second positions.

3. An overload protective control system for a dynamo electric machine adapted to be energized from a pair of alternating voltage supply terminals comprising, a pair of thermally responsive resistance devices each having a pair of terminals and each having negative temperature coefficients, said devices being connected in parallel relationship and adapted to be mounted in a dynamo electric machine in predetermined locations, a series parallel combination having a pair of terminals and comprising a pair of resistors each connected in a different branch of a parallel combination and a rectifier connected in series with the parallel combination, one terminal of said series parallel combination being adapted for connection to one of said supply terminals, a first pair of conductors including a first conductor for connecting the other of said supply terminals to one terminal of a first of said thermally responsive devices and including a second conductor connected between the other terminal of said first thermally-responsive device and the other terminal of said series parallel combination, a second pair of electric conductors connected to said first thermally sensitive devices at points electrically common, but mechanically separated from the points of connection of said first pair of conductors for supplying to the second of said thermally sensitive devices a voltage derived from said first device, and means for protectively deenergizing said dynamo electric machine in response to increased temperatures in said machine, said last-named means including an electroresponsive device having an operating coil connected in parallel with said second thermally sensitive device at points electrically common, but mechanically separated from the points of connection of said second pair of conductors thereto, and having a contact in one of said branches opened in response to a predetermined temperature of said thermally-sensitive devices and closed in response to a predetermined higher temperature of said thermally-sensitive devices to effect a reduction in the temperature differential between the operation of said electro-responsive device to said first and second positions.

4. An overload protective control system for a dynamo electric machine adapted to be energized from a pair of supply terminals comprising, a voltage dropping resistor adapted to be connected to one of said terminals, a pair of thermally responsive resistance devices having negative temperature coefficients adapted to be mounted in a dynamo electric machine in predetermined locations, a first pair of electrical conductors connected to a first of said thermally sensitive devices for supplying thereto a voltage derived from said terminals through said resistor, a second pair of electrical conductors connected to said first thermally sensitive device at points mechanically separated from the points of connection of said first pair of conductors for supplying to the second of said thermally sensitive devices a voltage derived from said first device, and means for protectively deenergizing said dynamo electric machine in response to increased temperatures in said dynamo electric machine including an electro-responsive device having a control element connected in parallel with said second thermally sensitive device at points mechanically separated from the points of connection of said second pair of conductors thereto.

5. An overload protective control system for a dynamo electric machine adapted to be energized from a pair of supply terminals comprising, a voltage dropping resistor adapted to be connected to one of said supply terminals, a pair of thermally responsive resistance devices having negative temperature coefficients adapted to be mounted in a dynamo electric machine in predetermined locations, two separate first leads leading to and connected to each terminal of a first one of said devices, one of said first leads connecting said dropping resistor in series with said first device and the other of said first leads being adapted for connection to the other of said supply terminals for supplying to said first device a voltage derived from the supply terminals through the dropping resistor, two separate second leads leading from the terminals of said first device to the terminals of said second device for connecting the devices in parallel relation, and means for protectively deenergizing said dynamo electric machine in response to increased temperatures in said dynamo electric machine including an electro-magnetically actuated relay having an operating winding connected to a pair of said leads in parallel relation with said devices.

References Cited in the file of this patent

UNITED STATES PATENTS

| | | |
|---|---|---|
| 2,446,474 | Harrold | Aug. 3, 1948 |
| 2,463,935 | Fish et al. | Mar. 8, 1949 |
| 2,509,252 | Salazar | May 30, 1950 |
| 2,641,748 | Peters | July 9, 1953 |
| 2,712,083 | Armstrong | June 28, 1955 |
| 2,999,188 | Alley | Sept. 5, 1961 |

FOREIGN PATENTS

| | | |
|---|---|---|
| 557,707 | Great Britain | Dec. 1, 1943 |
| 735,755 | Great Britain | Aug. 31, 1955 |